March 14, 1967  REIZO GUNJI  3,309,236
APPARATUS FOR CONTINUOUSLY MEASURING TEMPERATURES
OF ADVANCING METAL STRIPS
Filed Aug. 26, 1964

INVENTOR
Reizo Gunji
BY, Wenderoth,
Lind and Ponack, Attorneys

United States Patent Office 3,309,236
Patented Mar. 14, 1967

3,309,236
APPARATUS FOR CONTINUOUSLY MEASURING TEMPERATURES OF ADVANCING METAL STRIPS
Reizo Gunji, Kitakyushu, Japan, assignor to Yawata Iron & Steel Co., Ltd., Tokyo, Japan, a corporation of Japan
Filed Aug. 26, 1964, Ser. No. 392,204
Claims priority, application Japan, Aug. 27, 1963, 38/45,714
1 Claim. (Cl. 136—230)

This invention relates to an apparatus for measuring continuously the temperature of a metal plate or strip running on a rolling mill.

Hitherto, it has been very difficult to measure continuously the temperature of a metal plate running on a rolling mill, for example, a steel strip running on a strip mill. That is, a radiant oscillator has been used for measuring continuously the temperatures of a running steel strip but in order to detect the true temperatures of the steel strip, the measurement of the radiant energy of the surface of the steel strip has had to be corrected.

Though it is very important in the quality control of rolling products, the correction of the measurement of the radiant energy by the conventional apparatus was, however, sometimes very difficult or impossible, particularly when the surface of a steel strip had a coating, for instance, an electric insulating material, because of changes in the radiant energy.

An object of this invention is to provide a temperature measuring apparatus which can measure continuously the true temperatures of a running metal plate or strip, in particular, a running steel strip without correcting the measurement of the radiant energy of the metal.

Other objects of this invention will appear from the following description and accompanying drawing.

The continuous temperature measuring apparatus of the invention comprises a heat-collecting part in the form of a paraboloid-shaped concave mirror which collects the radiant heat from a running metal strip and reflects it to a focus of the mirror, a temperature-sensitive part consisting of a thermocouple extending into said heat-collecting part and having its terminal positioned almost at the focus of the concave mirror, a heat resisting hood for shielding said heat-collecting part and which opens at a level almost the same as that of the opening plane of said heat-collecting part, and a truck on which heat collecting part, temperature sensitive part and hood are mounted and consisting of a front wheel part and a pair of rear wheel parts, both front and rear wheels being adapted to rest on the surface of the metal strip running on the mill. As one end of said truck is fixed to some device located outside of the running metal strip, all wheels rotate as the metal strip runs on the mill. Further, the front wheel part is so arranged that it may freely turn in a horizontal direction around a vertical axis.

In the apparatus according to the present invention, which directly detects the radiant heat from a metal strip during running on the mill by means of a non-contact type heat sensitive device, e.g., a thermocouple, the features of this invention reside in that the focus of the heat-collecting concave mirror having a high reflection factor and a heat resistance, for instance, a gold-plated concave mirror, is so arranged that it coincides with the terminal of the heat sensitive part, whereby the detection of the heat can be carried out with an increased sensitivity, that the heat sensitive part is fixed to the truck mounted on the surface of the metal strip, whereby the detection of heat may be carried out while the metal strip is running on the mill, and that the front wheel part is so arranged that it may freely turn in a horizontal direction, whereby the stability of the heat-collecting body is secured, because it is freed from the oscillation of the running metal strip.

The invention will be explained in detail referring to an embodiment of this invention shown in the accompanying drawing.

Figure 1:
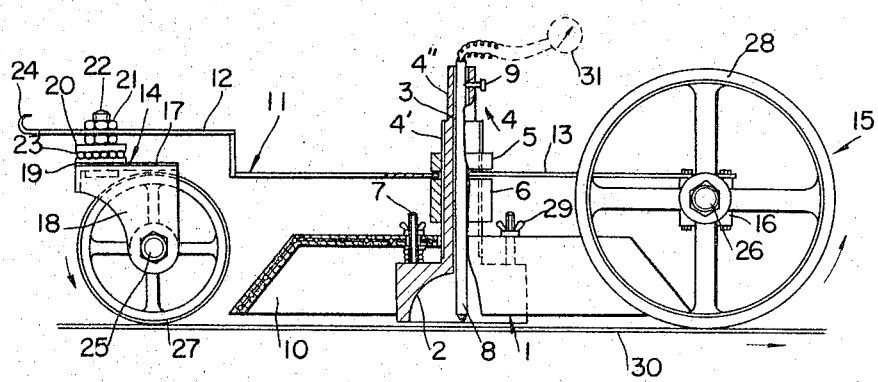
FIG. 1 is a front elevation view, partly in section, of a continuous temperature measuring apparatus according to one embodiment of this invention.
Figure 2:
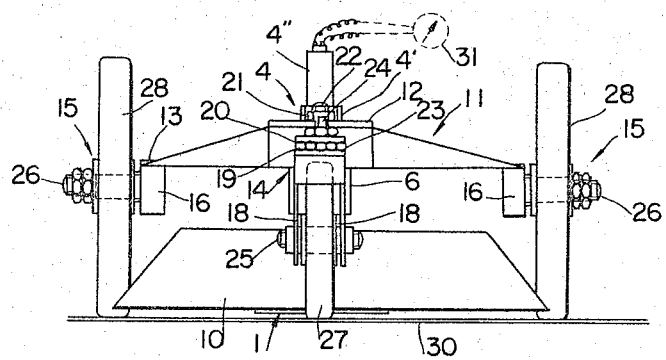
FIG. 2 is a right side view of the apparatus.
Figure 3:
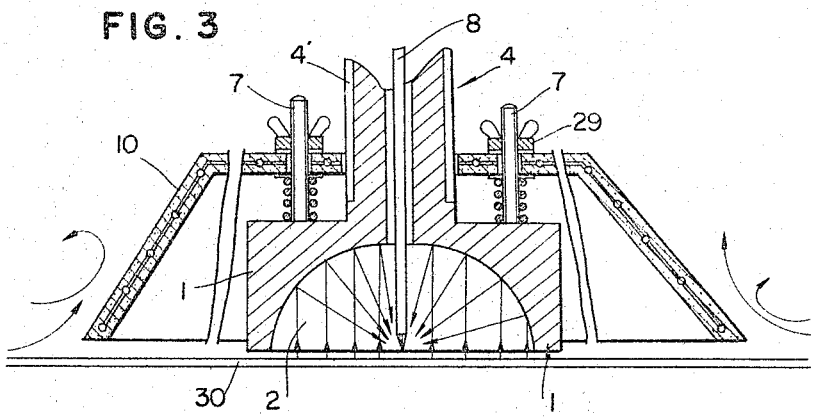
FIG. 3 is a cross sectional view of a heat-collecting part of the apparatus.

In FIG. 1 and FIG. 2 the combination of a heat-collecting part 2 for collecting the heat emitted from a running steel strip 30, an introducing part 3 through which a heat sensitive member 8 is inserted into and supported on the heat collecting part 2, and a bolt 7 for supporting a shielding hood 10 is designated hereinafter as a heat-collecting body 1. The above mentioned heat-collecting part 2 is a paraboloid-shaped concave mirror plated with a metal and having a high reflection factor, and the mirror is designed such that the focus is at the center of the opening at the bottom of the part 2 as shown in FIG. 3. A cylinder 4, the inside of which cylinder forms said introducing part 3, consists of a part 4" for supporting the heat sensitive member 8 and a part 4' for fixing the heat-collecting body 1 to the truck 11. The outside of the cylinder 4' is threaded to engage clamping means 5 and 6 for fixing the heat-collecting body 1 to the truck 11. The part 4" is equipped with a set-screw 9 for keeping the heat sensitive member 8 at a definite position.

The shielding hood 10 had a conical form and is made of a heat resisting material such as asbestos and has a hole at an upper surface which has a bolt 7 therein attached to the heat-collecting body 1.

The heat sensitive member 8 is a thermocouple, which may be made of Alumel-Chromel or iron-constantan according to the measuring temperatures. To the opposite end of the heat sensitive member 8 is connected a temperature indicator or recorder 31. The truck 11 consists of supporting tables 12 and 13 and wheel portions 14, 15 and 15. The table part 12 is equipped with a front wheel part 14 and the table part 13 is equipped with the heat-collecting body 1 and rear wheel parts 15 and 15.

The front wheel part 14 consists of a member for fitting the wheel part to the table part 12 and a wheel 27. The fitting part has a vertical axis and consists of, for example, a member 18 for supporting an axle 25, a step 19 placed on the upper surface 17 of the supporting member 18, a bolt 22 extending through the supporting member 18 and table 12, a nut 20 having a step at the lower end, and balls 23 placed between the above mentioned step 19 and the step of the nut 20. Thus, the supporting part 18 and the wheel 27 are so arranged that they can freely turn in a horizontal direction around the bolt 22 as the center. A wheel 27 is rotatably mounted on the axle 25. Each of the rear wheel parts 15 consists of a fitting part 16 mounted on the rear end of the table 13, an axle 26 on said fitting part 16, projecting somewhat horizontally, and a wheel 28 rotatably mounted on the axle 26. In this example, the diameter of the rear wheel 28 is designed to be larger than that of the above mentioned front wheel 27. To the front end of the table 12 is fixed a hook 24, with which one end of a cord or spring is engaged, the other end of said cord or spring being fixed to a device (not illustrated) located outside of the line of the running metal strip.

In practice, the heat-collecting body 1 is fixed to the truck 11 by means of the clamping means 5 and 6, and is placed adjacent to a strip 30 to be measured in a position such that the lower surface of the heat-collecting body will not be affected by outer disturbances such as hot or cold blasts in measuring the temperature.

Then, after setting the heat sensitive member 8 so as to position the pointed end of the member at the focus of the heat-collecting mirror, at which focus heat is collected by reflection by the paraboloid-shaped mirror, the heat sensitive member 8 is fixed by means of the set-screw 9, and thereafter the shielding hood 10 is set such that the lower opening of said hood is at almost the same level as the lower surface of the heat-collecting body 1 or slightly above the latter level, and the hood is fixed on the bolt 7 by means of the nut 29.

Then, one end of a cord or spring which is fixed at its other end to a device located outside of the line of the running metal strip, is hooked to the hook 24 on the front end of the truck and the whole apparatus is placed on the surface of the advancing metal strip. In this case, the front wheel part 14 is positioned to the left with respect to the advancing direction (arrow direction) of the steel strip 30 and the rear wheel part 15 is positioned to the right as shown in FIG. 1.

In the arrangement of the present invention as above mentioned, as the apparatus is placed on the surface of the advancing metal strip 30, the wheels can freely rotate as the metal strip runs, and as a small contact space is maintained between the surface of the running metal strip and the lower surface of the heat-collecting body, there is no measurement error caused by the undulating or wave oscillation of the running strip. Further, as the front wheel part 14 can be turned freely around the bolt 22, the oscillation of the steel strip is only slightly transferred to the tables 12 and 13, which makes the heat-collecting body stable at all times. Furthermore, as the heat emitted from the steel strip is reflected by the heat-collecting part 2 and collected at the focus, at which the heat contact point of the heat sensitive member 8 is positioned, almost all of the radiant heat can be collected and 90–95% of the true temperature of the steel can be measured. Also, in general, cold blast or hot blast inevitably occurs around an advancing heated steel strip, but the measurement error caused by such a disturbance can be prevented in this invention since the shielding hood 10 is placed around the heat-collecting part 2. Therefore, by the apparatus of this invention, extremely exact temperatures that have never been obtained by conventional devices can be detected by a temperature indicator or recorder.

As mentioned above, by the apparatus of this invention, the temperatures of the surface of an advancing metal plate or strip can be measured continuously and exactly, and hence, even in an operation for coating the surface of a metal strip, the coating process and a drying process can be managed quickly and exactly and also in the usual steel strip rolling process, the invention enables good heat conttrol as well as process control.

While the invention is described above with a peculiarity, it will be obvious that various changes and modifications may be made therein without departing from the spirit and scope of this invention as set forth in the appended claim.

What is claimed is:

An apparatus for continuously measuring temperatures of a running metal strip comprising a heat-collecting part in the form of a paraboloid-shaped concave mirror for collecting the radiant heat from the running metal strip to the focus of the concave mirror, a temperature sensitive part consisting of a thermocouple, said thermocouple extending into said heat-collecting part and a pointed end of said thermocouple being positioned almost at the focus of the concave mirror, a shielding hood enclosing said heat collecting part for shielding the heat-collecting part, and a truck on which said heat collecting part, said temperature sensitive part and said hood are mounted and having a front wheel part and a pair of rear wheel parts, said front wheel part being horizontally turnable around a vertical axis.

No references cited.

LOUIS R. PRINCE, *Primary Examiner.*

F. SHOON, *Assistant Examiner.*